(12) United States Patent
Schwarz et al.

(10) Patent No.: US 7,912,034 B2
(45) Date of Patent: Mar. 22, 2011

(54) METHOD AND APPARATUS FOR UTILIZING SYNCHRONIZATION INFORMATION

(75) Inventors: Uwe Schwarz, Veikkola (FI); Peter Muszynski, Espoo (FI); Harri Holma, Irving, TX (US); Sari Korpela, Espoo (FI); Jussi Numminen, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/421,331

(22) Filed: Apr. 9, 2009

(65) Prior Publication Data

US 2009/0219889 A1      Sep. 3, 2009

Related U.S. Application Data

(63) Continuation of application No. 10/424,934, filed on Apr. 29, 2003, now Pat. No. 7,525,948.

(60) Provisional application No. 60/375,831, filed on Apr. 29, 2002.

(51) Int. Cl.
*H04J 3/06* (2006.01)

(52) U.S. Cl. ........................................ 370/350; 455/502

(58) Field of Classification Search .................. 370/350, 370/310, 324, 331, 338, 439, 389, 401, 344, 370/512, 319, 321, 322, 323, 327, 328, 336; 455/404.1, 422, 424, 225, 502, 507, 515, 455/404, 100, 517

See application file for complete search history.

(56) References Cited

U.S. PATENT DOCUMENTS

| | | | |
|---|---|---|---|
| 5,327,577 | A | 7/1994 | Uddenfeldt |
| 5,345,600 | A | 9/1994 | Davidson |
| 5,375,123 | A | 12/1994 | Andersson et al. |
| 5,471,670 | A | 11/1995 | Hess et al. |
| 5,487,174 | A | 1/1996 | Persson |
| 5,491,837 | A | 2/1996 | Haartsen |
| 5,551,064 | A | 8/1996 | Nobbe et al. |
| 5,805,982 | A | 9/1998 | Hulsebosch |
| 5,822,699 | A | 10/1998 | Kotzin et al. |
| 5,943,326 | A | 8/1999 | Schroderus |
| 6,038,450 | A | 3/2000 | Brink et al. |
| 6,052,596 | A | 4/2000 | Barnickel |
| 6,111,864 | A | 8/2000 | Kabasawa |
| 6,119,018 | A | 9/2000 | Kondo |
| 6,188,904 | B1 | 2/2001 | Marsan |
| 6,208,631 | B1 | 3/2001 | Kim |
| 6,212,368 | B1 | 4/2001 | Ramesh et al. |
| 6,240,292 | B1 | 5/2001 | Haberman et al. |
| 6,240,553 | B1 | 5/2001 | Son et al. |
| 6,252,861 | B1 | 6/2001 | Bernstein et al. |
| 6,304,754 | B1 | 10/2001 | DeSantis et al. |
| 6,327,472 | B1 | 12/2001 | Westroos et al. |
| 6,337,984 | B1 | 1/2002 | Hong et al. |
| 6,385,437 | B1 | 5/2002 | Park et al. |

(Continued)

FOREIGN PATENT DOCUMENTS

WO      WO 93/19537      9/1993

*Primary Examiner* — Chi H Pham
*Assistant Examiner* — Alexander Boakye
(74) *Attorney, Agent, or Firm* — Slater & Matsil, L.L.P.

(57) ABSTRACT

A communication method and system are provided that include providing synchronization information about a co-sited downlink carrier. This information may be transmitted to from a base station to a mobile device. The mobile device may receive this information and perform handover or measurements based on the received synchronization information.

30 Claims, 4 Drawing Sheets

U.S. PATENT DOCUMENTS

| | | |
|---|---|---|
| 6,411,810 B1 | 6/2002 | Maxemchuk |
| 6,442,145 B1 | 8/2002 | De Lange et al. |
| 6,477,377 B2 | 11/2002 | Backstrom et al. |
| 6,481,317 B1 | 11/2002 | Reyes |
| 6,496,493 B1 | 12/2002 | Chung |
| 6,504,828 B1 | 1/2003 | Corbett |
| 6,507,741 B1 | 1/2003 | Bassirat |
| 6,532,364 B1 | 3/2003 | Uchida et al. |
| 6,546,252 B1 | 4/2003 | Jetzek et al. |
| 6,574,203 B2 | 6/2003 | Bernstein et al. |
| 6,574,456 B2 | 6/2003 | Hamabe |
| 6,690,936 B1 | 2/2004 | Lundh |
| 6,907,245 B2 | 6/2005 | Ohlsson et al. |
| 7,031,277 B2 | 4/2006 | Choi et al. |
| 7,031,711 B2 | 4/2006 | Soliman |
| 7,072,656 B2 | 7/2006 | Willars et al. |
| 7,099,673 B2 | 8/2006 | Yamashita |
| 7,102,994 B2 | 9/2006 | Sezgin et al. |
| 7,123,579 B1 | 10/2006 | Lyu |
| 7,184,769 B2 | 2/2007 | Tsutsumi et al. |
| 7,233,797 B2 | 6/2007 | Kanagawa |
| 7,302,268 B2 | 11/2007 | Wu et al. |
| 7,373,149 B2 | 5/2008 | Chen et al. |
| 7,525,948 B2 * | 4/2009 | Schwarz et al. .............. 370/350 |
| 2002/0004379 A1 | 1/2002 | Gruhl et al. |
| 2002/0147008 A1 | 10/2002 | Kallio |
| 2003/0096610 A1 | 5/2003 | Courtney et al. |

* cited by examiner

METHOD AND APPARATUS FOR UTILIZING SYNCHRONIZATION INFORMATION

The application is a continuation of U.S. patent application Ser. No. 10/424,934 to Schwarz, et al. filed Apr. 29, 2003 entitled, "Method and Apparatus for Utilizing Synchronization Information," now U.S. Pat. No. 7,525,948, which claims priority from U.S. Provisional Patent Application Ser. No. 60/375,831 filed Apr. 29, 2002, the subject matter of which is incorporated herein by reference.

TECHNICAL FIELD

This invention relates to wireless telecommunication systems. More specifically, the present invention relates to utilizing synchronization information for co-sited downlink carriers.

BACKGROUND

Wireless communication systems are widely deployed to provide various types of communication such as voice, data, and so on. These systems may be based on code division multiple access (CDMA), time division multiple access (TDMA), or some other modulation and multiple access techniques. In the development of third generation systems, cdma2000 and WCDMA, both CDMA systems, have emerged as competing technologies. Like earlier generations of CDMA, cdma2000 and WCDMA support soft handover. In soft handover, a mobile station such as cellular phone communicates via two or more base stations at one time. Techniques available for making soft handover depend upon the synchronization of base stations in the system.

SUMMARY OF THE INVENTION

Embodiments of the present invention may provide a communications method that includes obtaining synchronization information about a downlink carrier and performing an operation (such as handover or measurements) based on the obtained synchronization information. The downlink carrier may be a co-sited downlink carrier. The synchronization information may be provided based on a status bit or a plurality of bits. The synchronization information may indicate relative synchronization between downlink carriers.

Embodiments of the present invention may also include a communication system that includes at least one network device in a communications network and a mobile device operatively connected to the communications network. The at least one network device may provide synchronization information about a downlink carrier, and the mobile device may perform an operation based on the obtained synchronization information.

Other embodiments and features of the present invention will become apparent from the following detailed description taken in conjunction with the annexed drawings, which disclose preferred embodiments of the present invention.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like elements and wherein.

DETAILED DESCRIPTION OF ILLUSTRATIVE EMBODIMENTS

The particulars shown herein are by way of example and for purposes of illustrative discussion of arrangements and embodiments of the present invention. The description taken with the drawings make it apparent to those skilled in the art how embodiments of the present invention may be embodied in practice.

Further, arrangements and embodiments may be shown in block diagram form in order to avoid obscuring the invention, and also in view of the fact that specifics with respect to implementation of such block diagram arrangements may be highly dependent upon the platform within which the present invention is to be implemented. That is, these specifics should be well within the purview of one skilled in the art. Where specific details (e.g., flowcharts) are set forth in order to describe example embodiments of the invention, it should be apparent to one skilled in the art that the invention can be practiced without these specific details.

Embodiments of the present invention may relate to a communications method for a wideband code division multiple access (WCDMA) system, although other types of systems are also within the scope of the present invention. The method and network may provide synchronization information about a downlink carrier and transmit that information to a mobile device. The mobile device may thereafter perform a handover or inter-frequency measurements, for example, based on the received synchronization information. That is, the synchronization information may be used for fast and efficient measurements (Ec/IO or RSCP) or for user equipment (UE) synchronization (i.e., faster blind handovers). The synchronization information may be in the form of a single bit or a plurality of bits. This may be especially useful because when WCDMA carriers are co-sited, the downlink transmissions are synchronized (and possibly even chip synchronized). Thus, mobile devices making measurements on another carrier or handing over to another carrier may use this synchronization information to make the measurement/handover faster.

Figure 1:
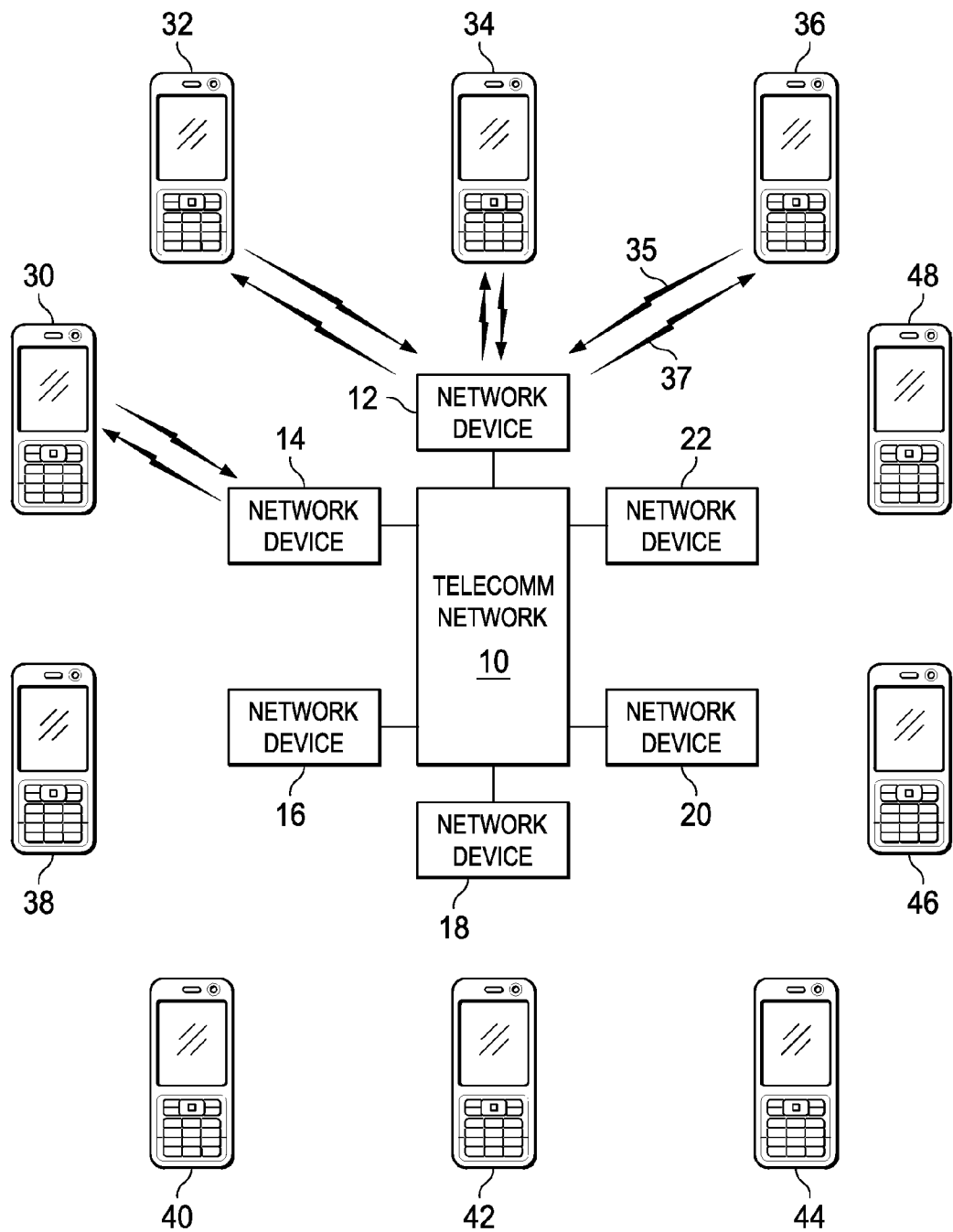
FIG. 1 is a diagram of a system according to an example embodiment of the present invention.

FIG. 1 shows a diagram of a system according to an example embodiment of the present invention. Other embodiments and configurations are also within the scope of the present invention. The system includes a telecommunications network 10 that includes network devices or nodes 12-22 and mobile devices (e.g., user equipment (UE), mobile nodes (MN), mobile stations (MS), etc.) 30-48. The terms mobile device, mobile node, and user equipment may be used interchangeably throughout this disclosure to refer to the same type of device.

The network devices 12-22 may be any type of network node or device that supports wireless devices connected to a telecommunications network, for example, a radio network controller (RNC), a base station controller (BSC), etc. The network device 12 and the mobile device 36 transfer data and control information between each other via uplink channels 35 and downlink channels 37. A base station or cell (not shown) may supply frequencies from a particular band of frequencies (e.g., a 2 gigahertz (GHz) core band or 2.5 GHz extension band) that allow the mobile device 36 to select from and use for a downlink carrier and uplink carrier. The uplink carrier frequency and downlink carrier frequency may be from the same band of frequencies, or from different bands of frequencies.

As a mobile device moves from one location to another, the base station or cell closest to the mobile device will likely then supply the uplink and downlink carriers for the particular mobile device. Generally, if the same band of frequencies is available at the neighboring base station, the network device may direct a soft handover to occur between the downlink and uplink carriers supplied from the original base station to downlink and uplink carriers supplied from the neighboring base station. Handoff between different base stations may depend upon synchronization information (such as time difference) between base stations.

A currently used network device 12 and/or neighboring network device 14, possibly along with the mobile device 36, may detect soft handover areas before a handover is to occur such that a handover may occur without causing uplink channel interference. Uplink interference may be caused when a mobile device moves to a location that does not supply the same bands of frequencies currently being used by the mobile device for its downlink carrier.

Each of the mobile devices 30-48 and/or the network devices 12-22 may perform various measurements in a periodic or continuous basis to detect soft handover areas for uplink interference avoidance. For example, measurements such as signal strength, signal quality, etc. may be made and compared with similar measurements of carriers from neighboring or co-sited bands to determine if a soft handover area exists and whether a handover should occur to avoid uplink interference. A network device and/or mobile device may determine the types of measurements made and when they are made. Moreover, a network device and/or mobile device may perform the measurements, wherein the latter case, a network node may instruct the mobile device to perform the measurements or the mobile device perform the measurements without instruction from the network device. Further, the mobile device may perform the measurements and report the results to the network device whereby the network device decides whether a soft handover area exists and whether a soft handover should occur to avoid uplink interference.

Signal quality of a carrier (downlink or uplink) may include interference from other cells and may be related to the signal quality at a specific mobile device. In contrast, signal strength may include the sum of all the signals and indicate the total strength in a specific frequency. With signal strength measurements, there is no differentiating between a particular mobile device's signal and other signals. Co-sited downlink (DL) carriers are downlink carriers from the same antenna or same base station or cell as the downlink carrier currently being used by a mobile device.

Measurement of the relative signal quality may also be performed. In this method, signal quality may be measured and compared with the signal quality of downlink carriers from another base station. Differences between the two may then be used to determine if a soft handover area exists.

Moreover, a mobile device currently using a current downlink carrier from a current cell and moving closer to a neighboring cell may look for a downlink carrier from the neighboring cell from the same frequency band as the current downlink carrier. If a downlink carrier is missing in this band, then the network device and mobile device know that a soft handover area exists where uplink interference may occur if the handover doesn't occur earlier.

Soft handover area detection may occur while a mobile device is in any mode or state, for example, the mobile device may be in an idle mode, or a connected mode where it is waiting for data or actively transmitting data. The mode or state of the mobile device may determine what types of measurements (e.g., inter-frequency measurements) may be made.

One reason for handover may be because the mobile device has reached the end of coverage of a frequency carrier in an extension (e.g., 2.5 GHz) band. The end of extension band coverage may invoke inter-band, inter-frequency or inter-system handover. The trigger criteria may always be the same. As inter-band handovers can possibly be done faster, separate trigger thresholds might be implemented. Some example coverage triggers for example arrangements may include, but are not limited to: handover due to uplink dedicated channel (DCH) quality, handover due to UE Tx power, handover due to downlink dedicated physical channel (DPCH) power, handover due to common pilot channel (CPICH) received signal chip power (RSCP), and handover due to a CPICH chip energy/total noise ratio (Ec/No). Handover is functional to keep a connection from being dropped while the mobile terminal is moving from one cell to another cell of the network.

Coverage may be another reason for handover. A coverage handover may occur if: (1) the extension band cell has a smaller coverage area (=lower CPICH power or different coverage triggers) than a core band, (2) currently used core band coverage ends (then also extension band), or (3) the UE enters a dead zone.

Intra-frequency measurements may be another reason for soft handover. A soft handover (SHO) procedure in an extension band may work in principle the same way as in core bands with branch addition, replacement and deletion procedures. SHO procedures may be based on CPICH Ec/IO measurements. Despite stronger attenuation in the extension band, Ec/IO as a ratio may be about the same for both bands. Therefore, in principle the same SHO parameter settings may be used in the extension band. However, if stronger attenuation in an extension band is not compensated for by additional power allocation, the reliability of SHO measurements (Ec/IO) may suffer. Moreover, an extension band cell might have neighbors on extension band frequencies and on core band frequencies at the same time. Then, the UE may have to measure both intra-frequency and inter-band neighbors.

Uplink (UL) interference in the core bands due to delayed SHO at the extension band coverage edge may occur. An extension band cell may have both extension band neighbors and core band neighbors at the same time. While for the extension band neighbor the normal SHO procedure may be sufficient, for the core band neighbor an early enough inter-band handover may have to be performed. Otherwise, serious UL interference could occur in the core band neighbor cell. SHO areas might be located relatively close to the base station and thus not necessarily relate to high UE transmit (Tx) power (or base transceiver station (BTS) Tx power). Coverage handover triggers may not be sufficient.

Figure 2:
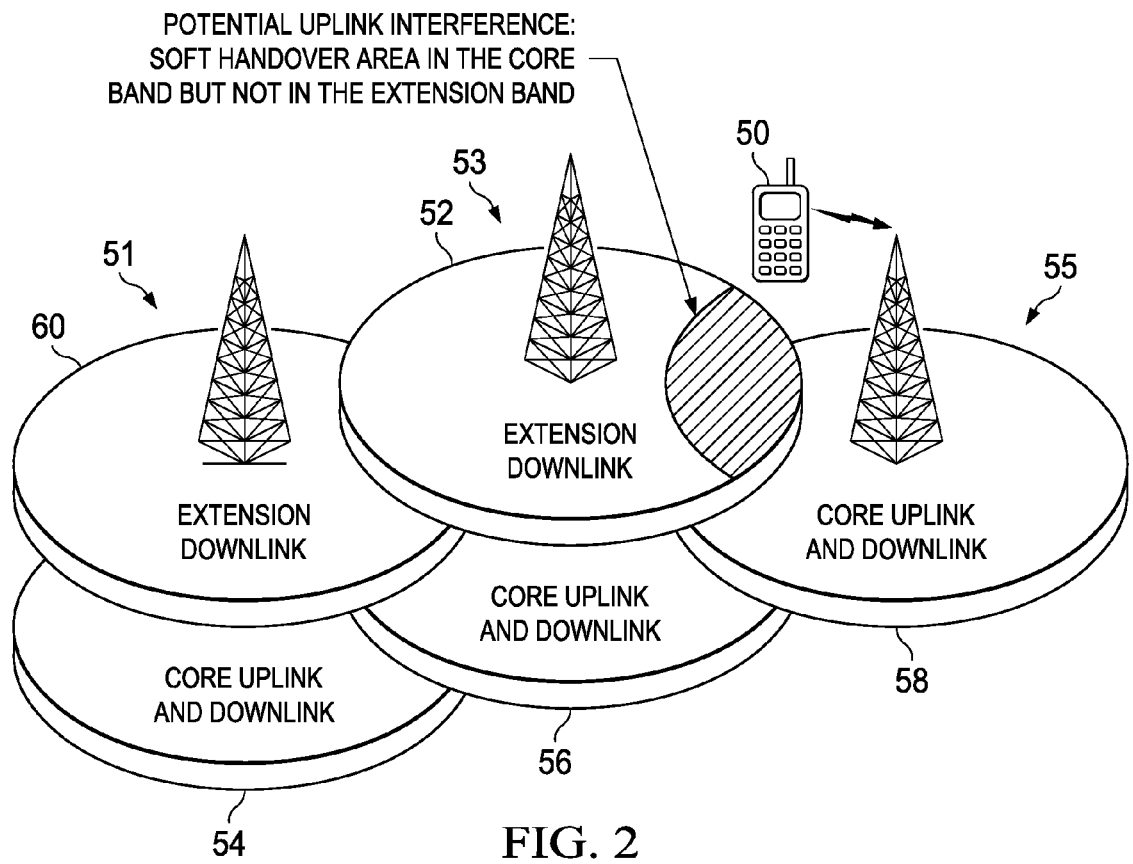
FIG. 2 is a diagram of an example interface scenario in an uplink channel according to an example arrangement.

FIG. 2 shows a diagram of a potential interface scenario in an uplink channel according to an example arrangement. Other arrangements are also possible. Three cells or base stations 51, 53, 55 are shown with slight intersection between neighboring (adjacent) coverage areas. The leftmost cell 51 supplies two co-sited bands of frequencies, an extension band of frequencies 60 and a core band of frequencies 54. The middle cell 53 also supplies two co-sited bands of frequencies, an extension band of frequencies 52 and a core band of frequencies 56. The rightmost cell 55 only supplies a core band of frequencies 58.

In this example arrangement, a mobile device (UE) 50 is using a downlink carrier from an extension band of frequencies 52 from the base station 53 closest to the mobile device 50. As the mobile device 50 moves from the left side of base station 53 and approaches cell coverage overlap areas, the mobile device 50 uses UL and DL carriers from neighboring cells (i.e., middle cell 53 and rightmost cell 55). Generally, if the mobile device 50 is using an UL and DL carrier in an extension band (e.g., a band of frequencies starting at approximately 2.5 GHz) cell, once the mobile device 50 moves towards the coverage of a neighboring extension band cell, a soft handover will occur between the DL and UL carriers of the neighbor cells. However, in a situation where there is no neighboring extension band cell as shown here, a soft handover cannot occur since the mobile device 50 must now obtain a DL and UL carrier from a core band (e.g., a band of frequencies starting at approximately 2 GHz) cell. This may cause interference in the UL carrier (not shown) of the neighboring cell. However, a network device may monitor this situation and cause selection of a different DL carrier in an existing band early to allow a soft handover from the extension band (e.g., 2.5 GHz) in middle cell 53 to the core band 58 (e.g., 2.0 GHz) in the neighboring cell 55, therefore avoiding potential interference in the UL carrier of the neighboring cell 55.

Figure 3:
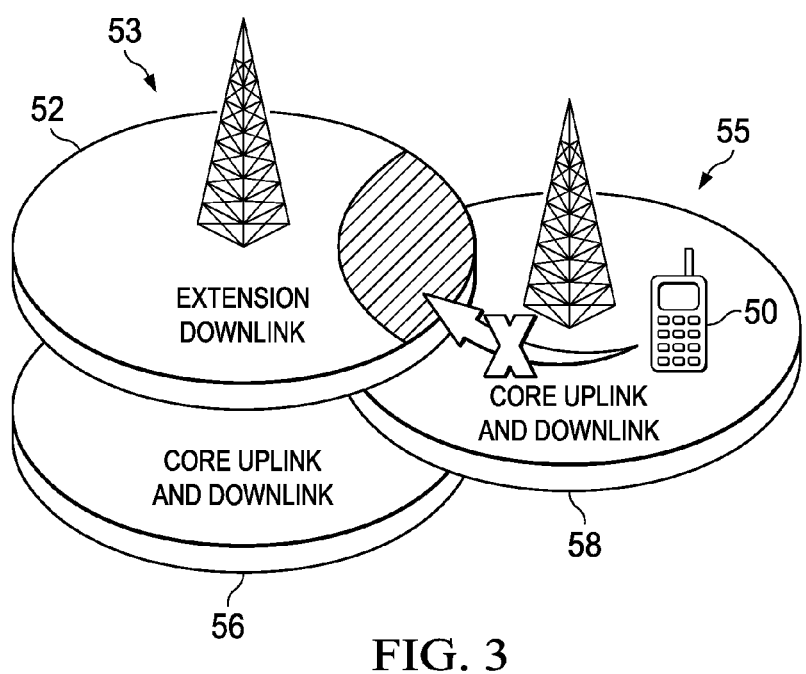
FIG. 3 is a diagram of another example interface scenario in an uplink channel according to an example arrangement.

FIG. 3 shows a diagram of another potential interface scenario in an uplink channel according to an example arrangement. Other arrangements are also possible. In this example, the mobile device (UE) 50 is using a downlink carrier from a core band of frequencies 58 from the base station 55. The mobile device 50 may not make a soft handover to the extension band 52 from the base station 53 since the mobile device 50 will be jumping into a potential interference area, causing UL channel interference. This situation may be detected and earlier decisions may be made regarding handover to avoid UL channel interference.

Figure 4:
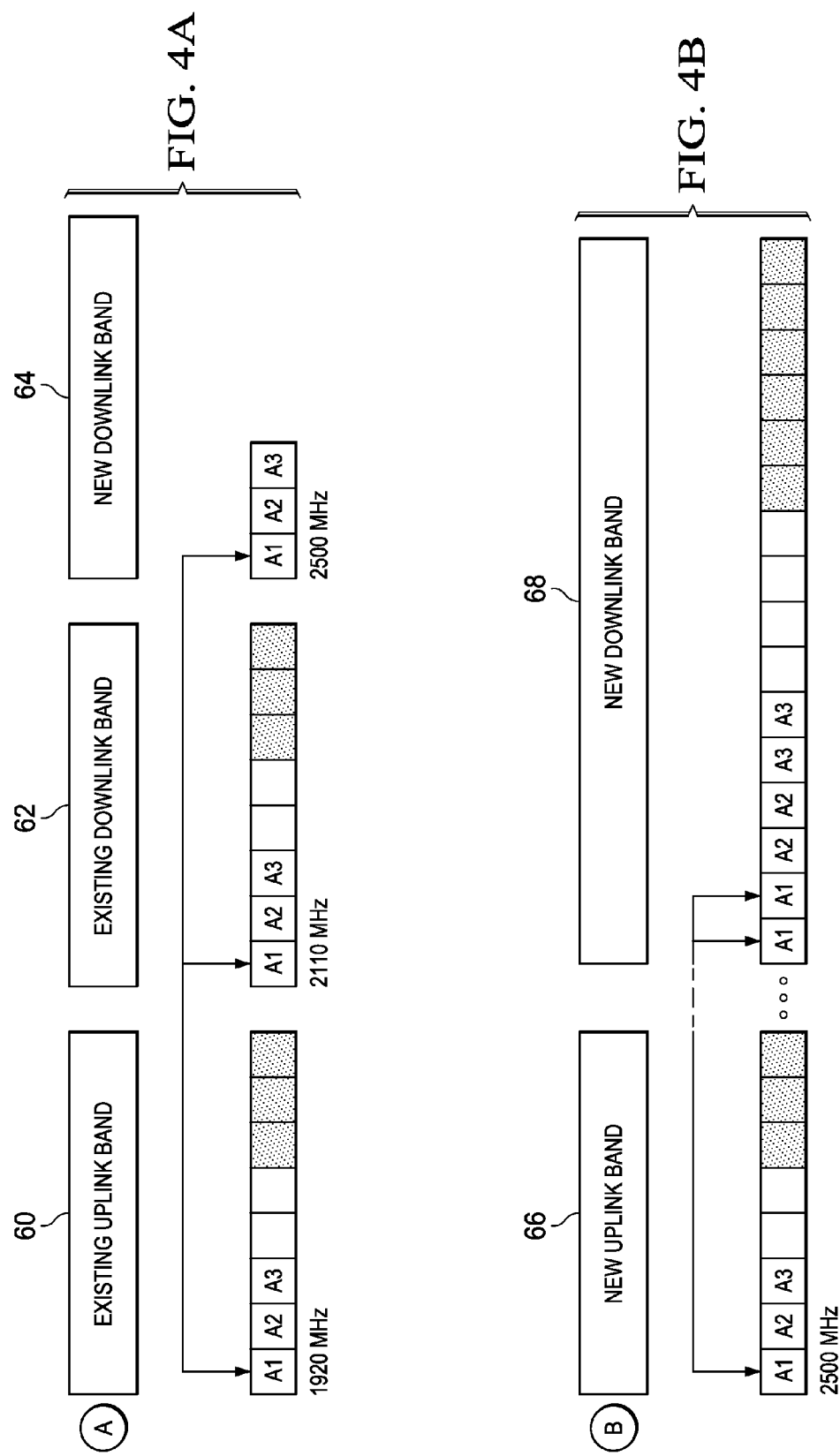
FIGS. 4A and 4B are diagrams showing uplink and downlink carrier pairings according to example arrangements.

FIGS. 4A and 4B show diagrams of uplink and downlink carrier pairings according to example arrangements. Other arrangements are also possible. Uplink and downlink carriers from the existing band generally may be frequencies supplied by the same cell, but may be supplied from different cells. Similarly, uplink and downlink carriers from the new band may be frequencies supplied from the same cell (different from the cell supplying existing band frequencies). The A1, A2, A3, . . . represent different uplink/downlink frequency pairings. The frequencies in the box for each band starting with "A", may be controlled by one operator at the cell, the frequencies in the blank boxes controlled by a second operator at the cell, and the frequencies in the darkened boxes controlled by a third operator at the cell.

In these example embodiments, the existing uplink frequency band is shown to include frequencies starting at approximately 1920 MHz, the existing downlink band to include frequencies starting at approximately 2110 MHz, and the new uplink and downlink bands to include frequencies starting at approximately 2500 MHz. However, the present invention is not limited by these frequency values but may be applied to any bands of possible frequencies. The frequencies being shown in FIGS. 4A and 4B are for illustration purposes only, and do not limit the scope of the present invention.

FIG. 4A shows an example arrangement where a mobile node (UE) may be connected with a uplink carrier frequency from an existing uplink band 60 and a downlink carrier frequency from an existing downlink band 62. The existing downlink carrier band 62 may be a core band from a cell closest to the location of the mobile node. A network node may determine that the mobile node should select a second downlink carrier, and direct the mobile node to start using a downlink carrier from frequencies in a new or different downlink band 64 (i.e., from a different cell). The mobile node may then use the uplink carrier from the existing uplink band 60 and a downlink carrier from a new or different downlink band 64.

FIG. 4B shows an example arrangement where a mobile node may have originally been using an uplink carrier from a new uplink band 66 and a downlink carrier from a new downlink band 68. The new uplink band 66 and new downlink band 68 may be from the same band of frequencies (e.g., starting at approximately 2.5 GHz where some frequencies are used for uplink carriers and some for downlink carriers). In this example embodiment, a network node may direct the mobile device to switch over and use a different downlink carrier, but from the same band of frequencies as the original downlink carrier. The frequencies in the new uplink band 66 and the new downlink band 68 may be supplied by the same cell, or from different cells.

Before a mobile station can communicate with a base station, the mobile station must acquire the code and frame timing of the base station. Each base station may broadcast its primary scrambling code without any data modulation on a common pilot channel (CPICH). However, it is not practical for a mobile station to search through all codes for each of the pseudo noise (PN) code phases, so base stations also transmit additional synchronization channels. As one example, the primary synchronization channel (P-SSC) may be a fixed sequence that is transmitted, for example, once per 2,560 chips, referred to as a slot. In a frame of 38,400 chips, there may be fifteen 2,560-chip slots. By searching for the P-SSC, the mobile station can acquire the slot timing.

After acquiring slot timing, the mobile station may turn to the secondary synchronization channel (S-SSC), which transmits a sequence that allows the mobile station to uniquely identify frame timing and narrow the scrambling code down to a group of eight possibilities. After acquiring the S-SSC, the final step is to search the CPICH using the eight scrambling codes to determine which one is actually in use by the base station.

In handover searching, each base station may broadcast the scrambling codes of its neighbor base stations. Even though the mobile station knows the scrambling codes of neighbor base stations, the mobile station must still acquire the timing of the neighbor base stations before it can include the neighbor base stations in its active set. Stated differently, the UE may utilize the primary synchronized channel (P-SCH), the secondary synchronized channel (S-SCH) and/or the primary common pilot channel (P-CPICH) to find the timing of another cell and identify a scrambling code to measure Ec/IO or RSCP. However, this search procedure makes measurements and handovers slow.

Embodiments of the present invention may not perform all of the above-described search procedures in the case of co-sited carriers and/or when synchronization information is appropriately provided to the UE. That is, UEs making measurements on another carrier or handing over to another carrier may use this synchronization information to make the search process faster (and therefore make the handover faster). This may be especially useful for operations involving an extension band (such as the 2.5 GHz frequency band for downlink carriers), inter-frequency measurements for interference detection in the core band and handovers between bands (e.g. for load balancing or coverage reason).

Embodiments of the present invention may utilize the synchronization information for fast and efficient measurement (Ec/IO or RSCP). This may be especially useful in compressed mode measurements, which are performed by stealing measurement time from the current active link data reception. Embodiments of the present invention may also utilize the synchronization information for UE synchronization such as to save compressed mode usage for handover (i.e., faster handovers).

The synchronization information of DL carriers may be indicated from the network to the UE. This may be done in measurement control information such as when neighbor cell information is provided by the network to the UE. This synchronization information may be a single bit that indicates chip synchronization based on the status of the bit. For example, the bit may be "1" to indicate chip synchronization and the bit may be "0" when there is no chip synchronization. The synchronization information (in the form of a plurality of bits) may also indicate the relative synchronization (e.g., time difference) when the DL carriers are synchronized but the chips are not synchronized (such as due to different antenna cable lengths). More specifically, when chip synchronization is achieved for all neighboring cells of a particular cell, the synchronization information may be informed for all neighboring cells by a common bit, for example. Alternatively, if some cells are chip synchronized and some chips are not chip synchronized, then the synchronization information may be provided separately for each neighboring cell. The synchronization (or co-siting) information may be either one bit or several bits.

The synchronization information may be sent from the network to the UE as a dedicated message in measurement control information, as a broadcast message in system information (broadcast control channel (BCCH)) and/or as measurement control system information. Both the measurement control and the measurement control system information may contain neighbor cell information for intra-frequency and inter-frequency cells.

Figure 5:
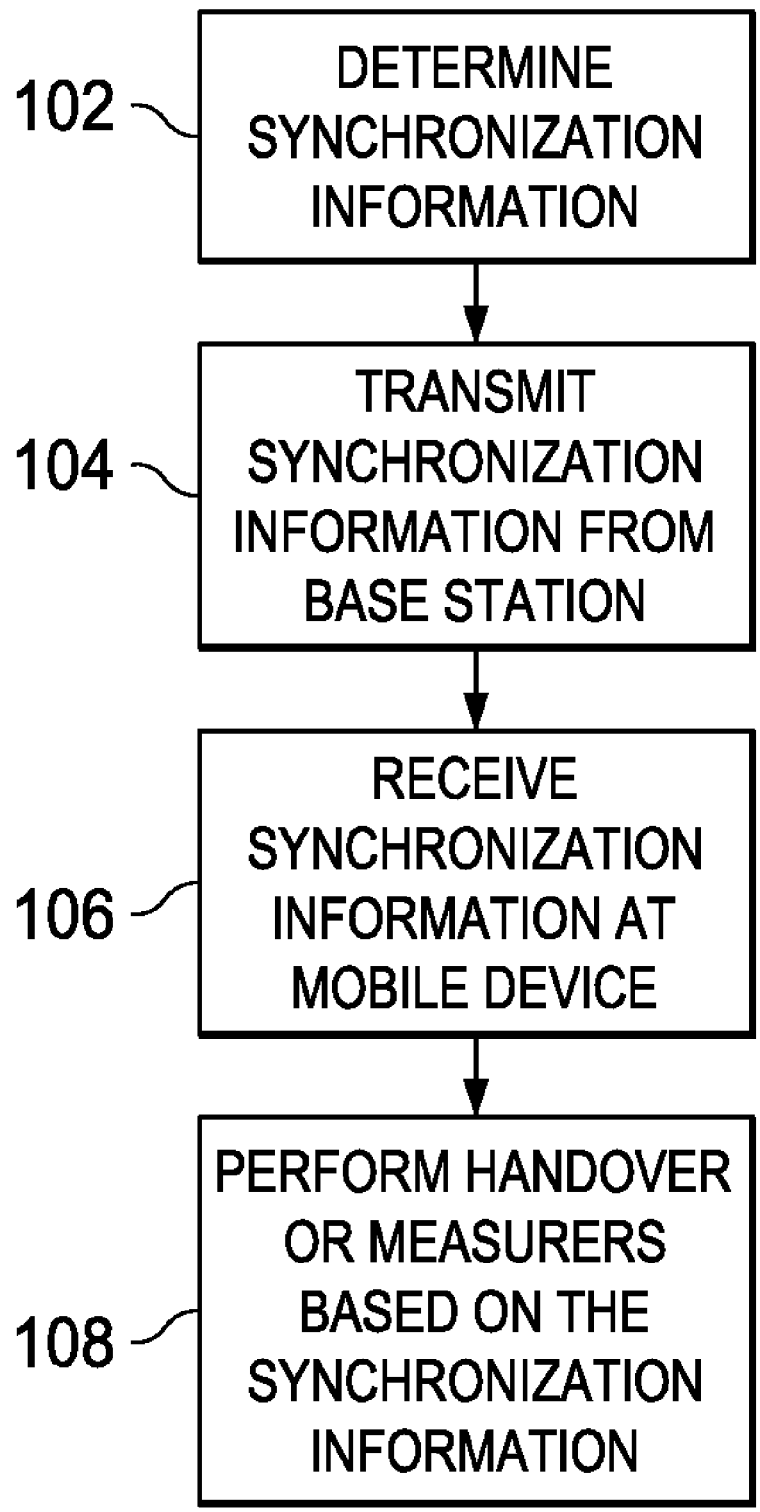
FIG. 5 is a flowchart showing operations according to an example embodiment of the present invention.

FIG. 5 is a flowchart showing operations according to an example embodiment of the present invention. Other embodiments, operations and orders of operation are also within the scope of the present invention. More specifically, in block 102, the network determines if it is synchronized and determines the type of information that will be transmitted. In block 104, the network may transmit the synchronization information (e.g., one bit or a plurality of bits) from a base station. Although not explicitly discussed, other base stations may also be transmitting their respective synchronization information. In block 106, a mobile device may receive the transmitted synchronization information. In block 108, the mobile device may perform any of a number of operations based on the received synchronization information. For example, the mobile device may include mechanisms to decipher the received synchronization information (such as a bit or a plurality of bits) and then perform an operation (through hardware and software) based on the received information. The operation may include, but are not limited to, handover (such as between different bands) and inter-frequency measurements.

Embodiments of the present invention are also applicable to equipping neighbor cells with the synchronization information. Further, the co-siting information may be given between the current serving or active cell and the corresponding co-sited neighbor cell on the other band. The co-siting information may also be given between an intra-frequency neighbor cell A and inter-frequency neighbor B, which is co-sited with the cell A.

In at least one embodiment, the synchronization information may include "reference time difference information." TS 25.331, v3.13.0 (2002-12), the subject matter of which is incorporated herein by reference, discusses three different accuracy classes for "reference time difference information."

Embodiments of the present invention may reduce the need of DL compressed mode usage, and may make UE measurements and handovers easier. Embodiments of the present invention may allow the mobile device to directly perform level measurement for a co-sited inter-frequency cell. This may be faster than a three-step cell search procedure (P-SSC, S-SSC and P-CPICH) and then CPICH level measurements (Ec/IO or RSCP).

Any reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art. As one example, embodiments of the present invention are also applicable to CDMA systems other than WCDMA.

What is claimed is:

1. A network device, comprising: a processor configured to: determine synchronization information indicating relative synchronization between a first co-sited downlink carrier in a core band and a second co-sited downlink carrier in an extension band; and participate in an inter-band operation initiated by a mobile station receiving said synchronization information indicating relative synchronization between said first and second co-sited downlink carriers.

2. The network device as recited in claim 1 wherein said processor is configured to transmit said synchronization information to a plurality of mobile stations in a cell site served by said network device.

3. The network device as recited in claim 1 wherein said inter-band operation includes an inter-band handover.

4. The network device as recited in claim 3 wherein said inter-band handover includes a blind handover from one band to another band.

5. The network device as recited in claim 1 wherein said processor is configured to provide said synchronization information to said mobile station as a status bit.

6. The network device as recited in claim 5 wherein said status bit indicates chip synchronization.

7. The network device as recited in claim 1 wherein said processor is configured to provide said synchronization information to said mobile station as a plurality of bits.

8. A network device, comprising:
   means for determining synchronization information indicating relative synchronization between a first co-sited downlink carrier in a core band and a second co-sited downlink carrier in an extension band; and
   means for participating in an inter-band operation initiated by a mobile station receiving said synchronization information indicating relative synchronization between said first and second co-sited downlink carriers.

9. The network device as recited in claim 8 further comprising means for transmitting said synchronization information to a plurality of mobile stations in a cell site served by said network device.

10. A computer program product comprising a program code stored in a non-transitory computer readable medium configured to:
   determine synchronization information indicating relative synchronization between a first co-sited downlink carrier in a core band and a second co-sited downlink carrier in an extension band; and
   participate in an inter-band operation initiated by a mobile station receiving said synchronization information indicating relative synchronization between said first and second co-sited downlink carriers.

11. The computer program product as recited in claim 10 wherein said program code stored in said non-transitory computer readable medium is configured to transmit said synchronization information to a plurality of mobile stations in a cell site served by a network device.

12. A method, comprising:
   determining synchronization information indicating relative synchronization between a first co-sited downlink carrier in a core band and a second co-sited downlink carrier in an extension band; and
   participating in an inter-band operation initiated by a mobile station receiving said synchronization information indicating relative synchronization between said first and second co-sited downlink carriers.

13. The method as recited in claim 12 further comprising transmitting said synchronization information to a plurality of mobile stations in a cell site served by a network device.

14. The method as recited in claim 12 wherein said inter-band operation includes an inter-band handover.

15. The method as recited in claim 12 further comprising providing said synchronization information to said mobile station as a status bit.

16. A mobile station, comprising: a processor configured to: receive synchronization information indicating relative synchronization between a first co-sited downlink carrier in a core band and a second co-sited downlink carrier in an extension and; and perform an inter-band operation based on said synchronization information indicating relative synchronization between said first and second co-sited downlink carriers.

17. The mobile station as recited in claim 16 wherein said processor is configured to conduct measurements relating to said inter-band operation.

18. The mobile station as recited in claim 16 wherein said inter-band operation includes an inter-band handover.

19. The mobile station as recited in claim 18 wherein said inter-band handover includes a blind handover from one band to another band.

20. The mobile station as recited in claim 16 wherein said processor is configured to receive said synchronization information as a status bit.

21. The mobile station as recited in claim 20 wherein said status bit indicates chip synchronization.

22. The mobile station as recited in claim 16 wherein said processor is configured to receive said synchronization information as a plurality of bits.

23. A mobile station, comprising:
   means for receiving synchronization information indicating relative synchronization between a first co-sited downlink carrier in a core band and a second co-sited downlink carrier in an extension band; and
   means for performing an inter-band operation based on said synchronization information indicating relative synchronization between said first and second co-sited downlink carriers.

24. The mobile station as recited in claim 23 further comprising means for conducting measurements relating to said inter-band operation.

25. A computer program product comprising a program code stored in a non-transitory computer readable medium configured to:
   receive synchronization information indicating relative synchronization between a first co-sited downlink carrier in a core band and a second co-sited downlink carrier in an extension band; and
   perform an inter-band operation based on said synchronization information indicating relative synchronization between said first and second co-sited downlink carriers.

26. The computer program product as recited in claim 25 wherein said program code stored in said non-transitory computer readable medium is configured to conduct measurements relating to said inter-band operation.

27. A method, comprising:
   receiving synchronization information indicating relative synchronization between a first co-sited downlink carrier in a core band and a second co-sited downlink carrier in an extension band; and
   performing an inter-band operation based on said synchronization information indicating relative synchronization between said first and second co-sited downlink carriers.

28. The method as recited in claim 27 further comprising conducting measurements relating to said inter-band operation.

29. The method as recited in claim 27 wherein said inter-band operation includes an inter-band handover.

30. The method as recited in claim 27 wherein said receiving includes receiving said synchronization information as a status bit.

* * * * *

UNITED STATES PATENT AND TRADEMARK OFFICE
CERTIFICATE OF CORRECTION

PATENT NO. : 7,912,034 B2
APPLICATION NO. : 12/421331
DATED : March 22, 2011
INVENTOR(S) : Schwarz et al.

Page 1 of 1

It is certified that error appears in the above-identified patent and that said Letters Patent is hereby corrected as shown below:

On the title page of the patent, section (60) should read:

(60) Provisional application No. 60/375,811, filed on Apr. 29, 2002

In the Specification:

At col. 1, line 4 should read:

This application claims priority from U.S. Provisional Patent Application No. 60/375,811 filed Apr. 29, 2002, the subject matter of which is incorporated herein by reference.

Signed and Sealed this
Fourteenth Day of May, 2013

Teresa Stanek Rea
*Acting Director of the United States Patent and Trademark Office*